United States Patent [19]

Gartner

[11] 4,429,186
[45] Jan. 31, 1984

[54] FLOATING BATTERY FEED CIRCUIT FOR TELEPHONE SUBSCRIBER LINE INTERFACE

[75] Inventor: Todd H. Gartner, Elmhurst, Ill.

[73] Assignee: GTE Automatic Electric Inc., Northlake, Ill.

[21] Appl. No.: 429,743

[22] Filed: Sep. 30, 1982

[51] Int. Cl.³ ............................................ H04M 19/00
[52] U.S. Cl. .................................. 179/77; 179/18 FA; 363/20
[58] Field of Search ................. 179/77, 23, 70, 18 FA; 363/18, 19, 20, 21; 323/282, 287

[56] References Cited

U.S. PATENT DOCUMENTS 4,056,691  11/1977  Freimanis et al. ............. 179/18 FA

OTHER PUBLICATIONS

M. Seliger, V. Kreft; "Pulse Width Controlled DC/DC Converter as DC Supply for Electronic Telephone Exchanges", Elektrotehniski Vestnik, vol. 43, No. 2, pp. 27–31, Apr. 1976.

*Primary Examiner*—Stafford D. Schreyer
*Attorney, Agent, or Firm*—Charles A. Doktycz; Peter Xiarhos

[57] ABSTRACT

An arrangement for providing a subscriber line with an operating potential. The energy to the line is transferred thereto inductively at a fixed frequency and includes the rectification means on the subscriber side of the inductor. The amount of energy transferred to the line is controlled by pulse width. The control pulse width circuit includes means to decrease the energy transfer above a level at which a subscriber station internal regulation would be defeated.

6 Claims, 5 Drawing Figures

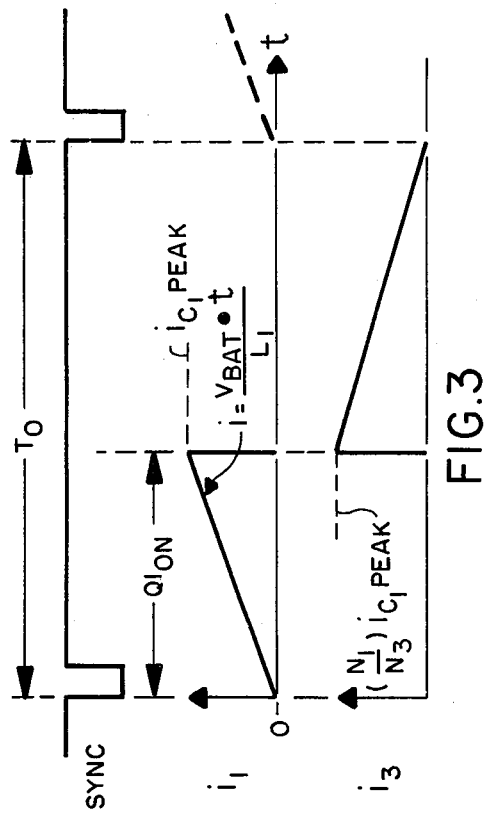
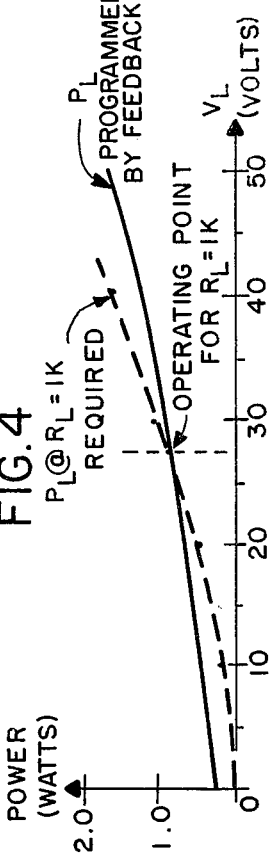
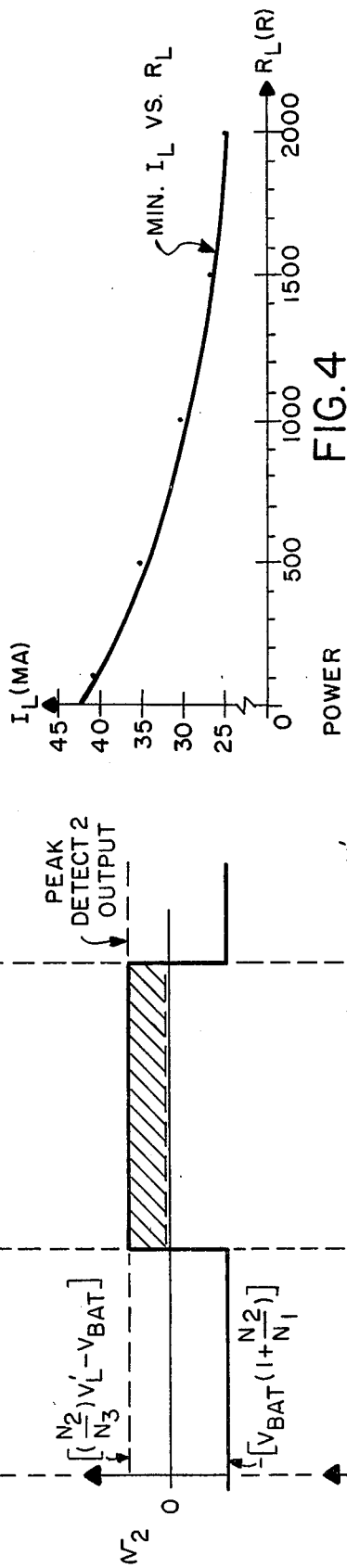
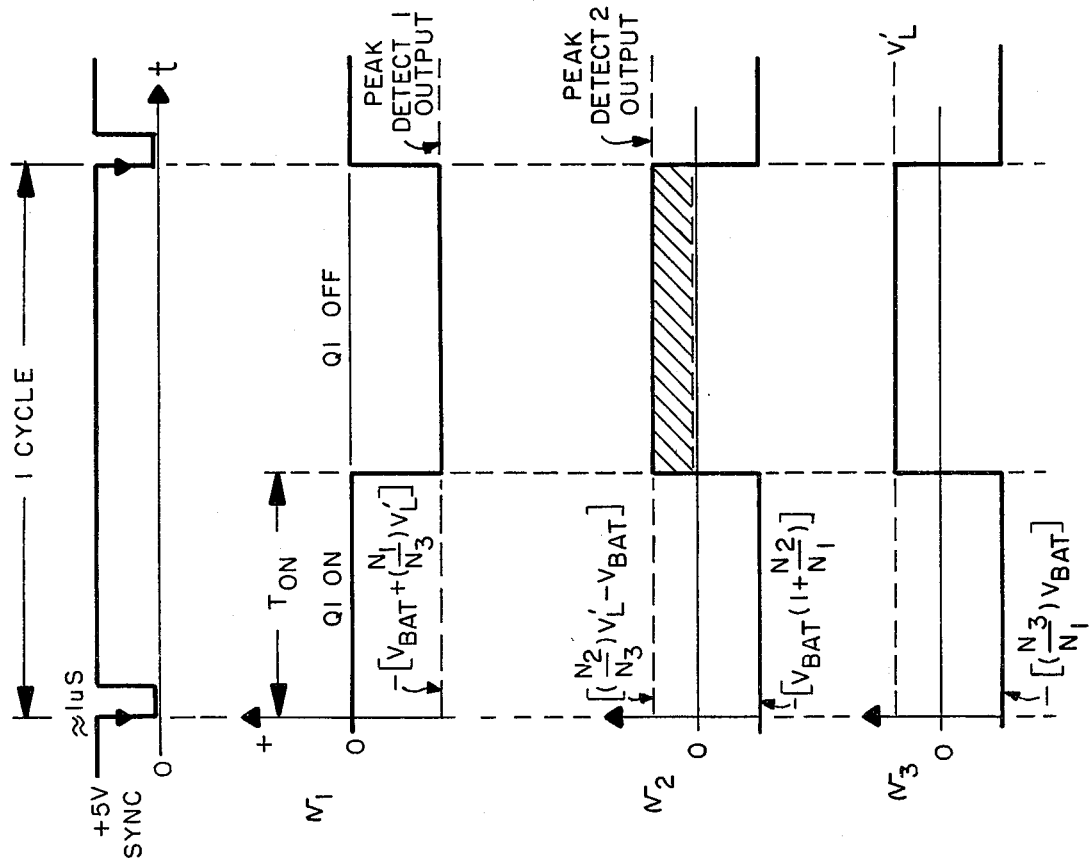

FLOATING BATTERY FEED CIRCUIT FOR TELEPHONE SUBSCRIBER LINE INTERFACE

BACKGROUND OF THE INVENTION

(1) Field of the Invention

The present invention relates to an arrangement for supplying communication lines with an operating current and more particularly to an arrangement to inductively couple this energy to the line.

(2) Description of the Prior Art

Traditionally, battery feed for a telephone subscriber's instrument has been provided via a relatively low resistance (about 400 ohms total) split winding transformer on the line side at the central office. This transformer feeds the loop current required by the telephone instrument from the "mid-point" of the split winding with a capacitor shunt for low a.c. impedance. The secondary of the transformer couples into the switching systems voice path. Because the transformer carries direct current, a physically large, expensive, and heavy device is required to maintain the high inductance necessary for a low insertion loss.

The telephone plant is frequently exposed to large longitudinal currents induced by commercial power lines. To prevent coupling of these currents into the metallic voice path, very good longitudinal balance is required. Achieving satisfactory balance and low susceptibility to 60 Hz induction is one of the more difficult tasks in line interface design. In the traditional method described, this requires careful transformer design with close matching of split winding characteristics. Separate means must also be provided for ON/OFF hookswitch sensing (loop supervision) apart from the battery feed scheme.

Recently, floating battery feed schemes have been proposed. An example of such a scheme is disclosed in the patent by L. Freimanis, et al., U.S. Pat. No. 4,056,691. In this approach, the battery feed current is coupled to the telephone instrument from a source of positive and negative potential that "floats," has very high impedance relative to earth ground. The intrinsic advantage of this method is that very good longitudinal balance, immunity to a.c. induction, is easily obtained. A measure of lightning transient protection comes naturally as a secondary benefit. In this method, the voice path is a.c. coupled to the "floating" line circuit which allows design of a much smaller, lighter coupling transformer. Also, loop detection of the ON/OFF state of the hook and dial pulses is possible via the same structure used to supply the floating d.c. potential.

SUMMARY OF THE INVENTION

One object of this invention is to provide a means to inexpensively supply a source of controlled current from a "floating" source relative to earth ground. The characteristic of the controlled current desired is such that no adjustment of the transmission parameters for loop resistance is required.

A second object of the invention is to generate this controlled current from a pulse width modulated flyback type d.c. to d.c. converter such that the switching frequency of this converter is in exact synchronism with the speech sampling frequency (8 kHz) in a digital switching system.

A third object of this invention is to inexpensively provide ON/OFF hookswitch detection and rotary dial pulse sensing from the basic structure of the battery feed.

A fourth object of this invention is to inexpensively provide a means of reducing on-hook (idle) power consumption of the battery feed itself.

A fifth object of this invention is to provide a means to inexpensively couple the audio (voice) path to the battery feed.

BRIEF DESCRIPTION OF THE DRAWINGS

The above objects and other features of the present invention and the manner of attaining them will become more apparent by reference to the following description taken in conjunction with the accompanying drawings in which:

FIGS. 2 and 3 show current and voltage wave forms at selected points in the circuit.

FIGS. 4 and 5 show the current and power relations on the line side.

DESCRIPTION OF THE PREFERRED EMBODIMENT

Figure 1:
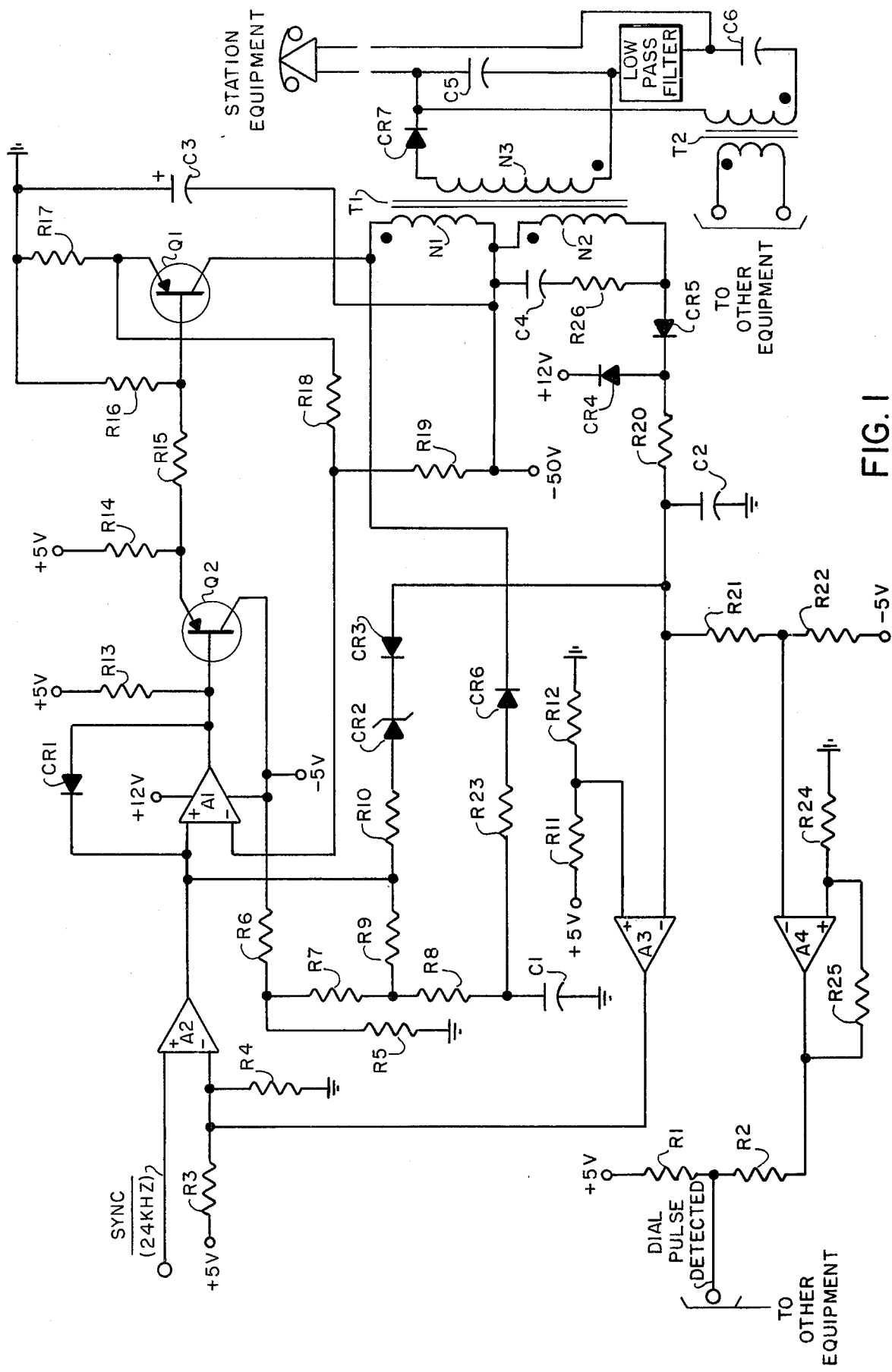
FIG. 1 shows communication line interface circuit in schematic form.

As noted earlier, a specific loop current vs. loop resistance is desired so that transmission gains do not require compensation for varying loop resistance. The desired curve is shown in FIG. 4.

In accordance with this invention, a basic flyback d.c. to d.c. conversion scheme is used wherein a three winding power transformer T1, is employed. The core material is a ferrite linear type as used for switching applications. The transformer T1 has a primary winding which is tapped to yield two windings N1 and N2, the center returning to negative exchange battery. The secondary is a single isolated winding N3. An output transistor Q1, driven by control circuitry, is used in the saturated ON or the OFF state to switch current through the first winding N1 of the primary side. When this transistor Q1 is turned on, current is allowed to build in the first winding until a predetermined level is reached whereupon it is turned off.

The control circuitry employs a comparator which serves both as a memory latch and a threshold detector for the output transistor's emitter current. The latch is set with the output transistor in the conductive state by a sync. pulse generated externally by the digital switching system. The latch is reset when the output transistor's emitter current exceeds a programmable threshold value.

When transistor Q1 is not conducting, and the comparator A1 of the control circuitry output is high, the (+) input CR1 holds the plus input at +3 volts. The plus input of comparator A1 exceeds the minus input (which is at about −1 V), so the positive feedback via diode CR1 keeps the comparator A1 output high. The LM339 comparators employed in the embodiment here described have open collector NPN outputs with their emitter returned to the negative potential of −5 V. The output transistor of the comparator A3 is also off resulting in +2.5 volts at the comparator A2 minus input. When the sync. pulse input goes low, comparator A2 output will pull to a low of −5 V, which through diode CR1, also pulls the comparator A1 output to about −5 V. At this time the latching action of diode CR1 is disabled. The sync. pulse frequency is chosen to be an integral multiple, such as 24 kHz, of the speech sampling rate and synchronized with it. This is done to prevent any "beat frequency" effects which might arise from the converter switching frequency differences to 8 kHz; the beat frequencies could unintentionally be sampled by the 8 kHz and be digitized as an interfering audible signal with the voice signal. When the sync. goes high about 1 uS later, the comparator A1 negative input returns to a d.c. voltage determined by resistors R5 through R10 and the first peak detector, consisting of diode CR6, resistor R23 and capacitor C1, for loops up to about 1500 ohms. For this range of operation, the input voltage at the comparator A1 plus input is always less than the voltage at the comparator A1 minus input, which is about $-1$ V, so that the comparator A1 output remains low. Transistor Q2 serves as a current buffer to drive the transistor Q1 base on. The current in the first winding N1 of transformer T1 is zero immediately after the sync. pulse goes low and builds linearly determined by core parameters, winding, and $V_{BAT}$ (FIG. 3). The current level sensed through resistor R17 results in a proportional voltage drop to which is added about $-1$ V via resistors R18, R19 divider connected to $V_{BAT}$. This final voltage feeds the comparator A1 minus input. As current in the first winding N1 builds up, the voltage at the comparator A1 negative input continues moving lower until it equals the voltage at the positive input, at which time the comparator A1 output goes high via the diode CR1, keeping transistor Q1 non-conductive. The output will stay high until the next sync. pulse arrives. The peak current level in winding N1 is seen to be controlled, therefore, by the voltage at the comparator A1 positive input.

As soon as transistor Q1 turns off, the polarities of all winding voltages reverse and diode CR7 is forward biased by the secondary winding N3. The current labeled i3 of FIG. 3 now results and energy stored in the core flux is transferred to storage capacitor C5. The value of capacitor C5 is chosen so that a small ripple occurs on a substantially d.c. level for a switching rate of 24 kHz. The voltage on C5 reaches a steady-state level dependent on the external loop (load) resistance, wherein the energy stored in winding N1 equals the power dissipated by the load times the cycle time "To". The net result is that an average d.c. voltage is established such that the average current drawn by the subscriber loop equals the average current supplied by the secondary. For a fixed cycle time (fixed frequency) system, as this is, an average loop voltage at a given loop current is equivalent to a certain power dissipation and also to a proportionate energy stored in the primary (just prior to the transistor turn-off). Since the energy stored in the primary is proportional to primary current (squared) and in turn by the control voltage Vc, loop voltage or loop current at a given loop resistance, can be controlled at the isolated primary side by Vc.

This is the essential means of controlling loop current to achieve the desired characteristic. This is a characteristic wherein loop current is not constant but gradually varies with loop resistance such that about 40 ma flows on short loops (100 ohms) and about 25 ma on long loops (2000 ohms). This characteristic keeps power dissipation low on short loops without the necessity of adjusting transmission gains, which would be required if the current were constant over loop resistance. The control is achieved by feeding back the negative peak detected voltage from the primary winding when the output transistor turns off. The voltage is proportional to the secondary voltage stored on the capacitor and the loop voltage. This voltage is, linearly scaled and offset by an appropriate resistor network and the resultant voltage, Vc, applied to the comparator/latch. By appropriate choice of offset and scale values for the resistor network, along with core and winding parameters, an adequate approximation to the desired loop current versus loop resistance results, where the loop voltage is programmed by the characteristic of the transformer and resistor network.

During the time transistor Q1 is non-conductive, the voltage at the transistor Q1 collector, $V_1$ of FIG. 1, achieves the value shown in FIG. 2, which is of negative polarity. The first peak detector consisting of diode CR6, resistor R23 and capacitor C1, stores the value of this negative voltage and feeds it to the feedback resistor network, R5 through R10. Resistors R7 and R8 scale the voltage down while resistors R5 and R6 provide a fixed offset bias. The result is fed to the comparator A1 positive input. Thus the secondary voltage $V_L$, reflected back to the first winding N1 during the transistor Q1 off time, is scaled and offset and controls comparator A1 such that a predetermined load voltage versus load resistance characteristic results. Although the feedback overall is positive in effect, a stable $V_L$ results. This can be seen from FIG. 5 where load power versus load voltage is plotted. It can be seen that to the right of the operating point, required power exceeds available power, and vice-versa to the left; hence the operating point is stable.

The other winding N2 on the primary side feeds a second peak detector such that the positive peak voltage on this winding, if it exceeds the exchange battery voltage in magnitude, is stored on the peak detector capacitor C2. This voltage is also proportional to the secondary winding loop voltage. By proper choice of winding turns ratios, this voltage will also effect loop voltage conrol but only when a predetermined loop resistance is exceeded. For a loop resistance less than about 1500 ohms, the voltage at winding N2 ($V_2$ of FIG. 1) is negative, since $V_2$ in magnitude does not exceed $V_{BAT}$. The second peak detector, consisting of diode CR5, resistor R20 and capacitor C2, has a net voltage of $-5$ volts because resistors R21 and R22 discharge capacitor C2 to this potential. Diode CR3 is reverse biased and this peak detector has no effect on line voltage $V_L$ control. As loop resistance increases above about 1500 ohms, capacitor C2 stores a positive potential. When this potential exceeds the breakdown of diode CR2, current is fed via resistor R10 to the comparator A1 positive input. Resistors R9 and R10 are chosen to control the degree of feedback from its first peak detectors to comparator A1. This second feedback path via resistor R10 is strongly negative in overall effect; a tendency to increase in the line voltage $V_L$ causes the transistor Q1 pulse width to decrease, thus lowering the line voltage $V_L$. The effect is to stabilize the line voltage $V_L$ at a predetermined level; the feedback is selected so that the "error voltage" ($V_L$ vs $R_L$) is on the order of 10 volts for $R_L$ of 2000 to 8000 ohms. Using this relationship, the seond peak detector output is divided down by resistors R21 and R22 and fed to comparator A4. This comparator trip point is set to guarantee detection in the range of loop resistance up to 8 Kohms, and becomes the supervisory detection output, where the comparator A4 output high means off-hook. Hysteresis is added via resistors R24 and R25 to mask ripple on capacitor C2. The time constants of capacitor C2, resistors R21 and R22 are chosen to give a faithful dial pulse reproduction.

As loop resistance continues to increase above about 8 Kohms, comparator A3 is actuated. The threshold is set by R11, R12 divider. The function of A3 is to pull the minus input of A2 to −5 volts for $R_L$ exceeding about 8000 ohms. This action gates off the sync. pulse from propagating through A2 and prevents latch A1 from being set. Transistor Q1 therefore stays off. In actual operation, this is a pulse rate modulation of Q1 by the negative feedback via A3, and serves to maintain loop voltage maximum near 65 volts. This in addition to the action of the second peak detector provides for a fine degree of energy control needed as the loop resistance nears infinity, the on-hook condition. This "idle power shutdown" minimizes total power dissipation in the idle or on-hook state.

The audio path is coupled to the loop tip and ring conductors via a capacitor and a coupling transformer T2. Since no direct current flows in this transformer it may be of a small size wound on a high permeability ferrite core. An electronic low pass filter, simulating an inductor, resides on the loop side between C5 and the station equipment, so that a high a.c. impedance is present looking into the battery feed. This is necessary to prevent loading of the audio signal coupled to the station equipment.

What is claimed is:

1. A circuit operated in synchronism with an external pulse source for supplying and monitoring direct current in a transformer isolated line comprising:

a transformer having an input winding and an output winding;

a capacitor connected across said output winding;

a rectifier connected between said output winding and said capacitor with said line connected across said capacitor for receiving an operating potential;

a pulse width voltage coverter operated in response to said pulse source to output a power pulse through said input winding; and a first negative peak voltage detector connected to said input winding operated to condition said converter to increase the duration of said power pulse upon sensing a negative peak voltage below a predetermined level.

2. A circuit as claimed in claim 1, wherein said transformer further includes a sense winding and a second peak voltage detector connected to said sense winding operated upon detecting a second predetermined voltage level to control said converter to decrease the rate of voltage increase.

3. A circuit as claimed in claim 2 further including a resistor network between said first and second peak voltage detectors and said converter operated to proportion the effective control of said converter.

4. A circuit as claimed in claim 3 further including a zener diode between said second peak voltage detector and said resistor network to set said second predetermined voltage level.

5. A circuit as claimed in claim 2 or 4 further including a shutdown means connected between said second peak voltage detector and said converter operated upon said second peak voltage detector indicating a third voltage level to shut down said converter.

6. A circuit as claimed in claim 2 further including dial pulse detection means comprising an amplifier controlled by said second peak detector sensing voltage changes due to line interruptions reflected into said sense-winding to repeat said signals.

* * * * *